(12) United States Patent
Ki et al.

(10) Patent No.: US 9,097,933 B2
(45) Date of Patent: Aug. 4, 2015

(54) POLARIZER AND LIQUID CRYSTAL DISPLAY INCLUDING THE SAME

(71) Applicant: Samsung Display Co., Ltd., Yongin (KR)

(72) Inventors: Boo-Kan Ki, Yongin-si (KR); Gwan Young Na, Osan-si (KR); Hee Wook Do, Cheonan-si (KR); Kwang-Hyun Kim, Gunpo-si (KR); Dae Won Kim, Dongducheon-si (KR); Teck Soo Kim, Seongnam-si (KR); Seung Beom Park, Hwaseong-si (KR); Duck Jong Suh, Seoul (KR); Na Young Shin, Seoul (KR); Sang-Gu Lee, Hwaseong-si (KR); Ji-Hoon Kim, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 180 days.

(21) Appl. No.: 13/846,018

(22) Filed: Mar. 18, 2013

(65) Prior Publication Data

US 2014/0139787 A1    May 22, 2014

(30) Foreign Application Priority Data

Nov. 20, 2012 (KR) .......................... 10-2012-0131714

(51) Int. Cl.
*G02F 1/1335* (2006.01)
*G02F 1/1337* (2006.01)
(Continued)

(52) U.S. Cl.
CPC .......... *G02F 1/133528* (2013.01); *G02B 5/205* (2013.01); *G02B 5/3041* (2013.01); *G02F 1/133526* (2013.01); *G02F 1/133634* (2013.01); *G02F 2001/133545* (2013.01)

(58) Field of Classification Search
CPC .......... G02F 1/133528; G02F 1/13362; G02F 1/133526; G02F 1/13363; G02F 1/133634; G02F 1/1393; G02F 1/133707; G02F 2001/133742; G02B 5/3041; G02B 27/283; G02B 5/3033; G02B 5/3083; H04N 9/3197; H04N 9/3167; H04N 3/3105
USPC .................... 349/96, 117, 9, 130; 359/485.03
See application file for complete search history.

(56) References Cited

U.S. PATENT DOCUMENTS 5,619,356 A    4/1997    Kozo et al.
6,184,955 B1   2/2001    Okumura
(Continued)

FOREIGN PATENT DOCUMENTS

JP    08-122756    5/1996
JP    2002-139622  5/2002
(Continued)

OTHER PUBLICATIONS

Extended European Search Report dated on Feb. 10, 2014 in European Patent Application No. 13163667.2-1904.

*Primary Examiner* — Mike Qi
(74) *Attorney, Agent, or Firm* — H.C. Park & Associates, PLC

(57) ABSTRACT

A polarizer includes a reflective polarizer main body and an Rth compensation layer. The reflective polarizer main body includes a repetitively laminated structure, the repetitively laminated structure including two layers of different refractive indices repetitively disposed on one another. The Rth phase compensation layer is disposed at one side of the reflective polarizer main body. The Rth phase compensation layer is configured to compensate for a phase difference in an Rth direction.

11 Claims, 18 Drawing Sheets

(51) Int. Cl.
*G02B 5/30* (2006.01)
*G02B 5/20* (2006.01)
*G02F 1/13363* (2006.01)

(56) References Cited

U.S. PATENT DOCUMENTS

| | | |
|---|---|---|
| 7,385,763 B2 | 6/2008 | Nevitt et al. |
| 7,443,585 B2 | 10/2008 | Hara et al. |
| 7,492,516 B2 * | 2/2009 | Takahashi et al. ....... 359/489.01 |
| 7,531,234 B2 | 5/2009 | Nakamura et al. |
| 7,557,989 B2 | 7/2009 | Cross et al. |
| 7,724,434 B2 | 5/2010 | Cross et al. |
| 7,791,687 B2 | 9/2010 | Weber et al. |
| 7,932,975 B2 | 4/2011 | Sakai et al. |
| 8,035,774 B2 | 10/2011 | Ouderkirk et al. |
| 2007/0008459 A1 | 1/2007 | Park et al. |
| 2007/0236636 A1 * | 10/2007 | Watson et al. ................. 349/117 |
| 2007/0264447 A1 | 11/2007 | Oya et al. |
| 2008/0151147 A1 * | 6/2008 | Weber et al. .................... 349/96 |
| 2010/0157195 A1 * | 6/2010 | Miyatake et al. ............... 349/62 |
| 2010/0231831 A1 * | 9/2010 | Miyatake et al. ............... 349/96 |

FOREIGN PATENT DOCUMENTS

| | | | |
|---|---|---|---|
| JP | 2006-099139 | 4/2006 | |
| JP | 2007-233244 | 9/2007 | |
| JP | 2007-298634 | 11/2007 | |
| JP | 2008-241893 | 10/2008 | |
| JP | 2008-242047 | 10/2008 | |
| JP | 2009-047802 | 3/2009 | |
| JP | 4612562 | 10/2010 | |
| JP | 4746475 | 5/2011 | |
| JP | 4939059 | 3/2012 | |
| KR | 10-0558161 | 2/2006 | |
| KR | 10-2007-0117821 | 12/2007 | |
| KR | 10-2010-0009510 | 1/2010 | |
| KR | 10-0971105 | 7/2010 | |
| KR | 10-2010-0089598 | 8/2010 | |
| KR | 10-0989046 | 10/2010 | |
| WO | 01/38907 | 5/2001 | |
| WO | WO 01/38907 | * 5/2001 | ............... G02B 5/08 |

* cited by examiner

POLARIZER AND LIQUID CRYSTAL DISPLAY INCLUDING THE SAME

CROSS-REFERENCE TO RELATED APPLICATION

This application claims priority from and the benefit of Korean Patent Application No. 10-2012-0131714, filed on Nov. 20, 2012, which is incorporated by reference for all purposes as if set forth herein.

BACKGROUND

1. Field

Exemplary embodiments relate to display technology, and more particularly, to reflective polarizers and liquid crystal displays including the same.

2. Discussion

A liquid crystal display, which is one of the most common types of flat panel displays, typically includes two panels with field generating electrodes disposed thereon, such as a pixel electrode, a common electrode, and the like, and a liquid crystal layer disposed therebetween. The liquid crystal display is configured to apply an electric field in the liquid crystal layer by applying voltage to the field generating electrodes, and determine the direction of liquid crystal molecules of the liquid crystal layer by the generated electric field, and control polarization of incident light to faciliate the display of images.

Conventional liquid crystal displays are typically classified into three categories, e.g., transmissive liquid crystal displays, reflective liquid crystal displays, and transflective liquid crystal displays. A transmissive liquid crystal display may be configured to display an image by using a backlight positioned at a rear side of a liquid crystal cell. A reflective liquid crystal display may be configured to display an image by using external natural light. A transflective liquid crystal display may be configured to operate in a transmissive mode to display an image by using an embedded light source of a display element while indoors or in a dark place where external light is limited and operate in a reflective mode to display an image by reflecting external light in an outdoor high-illumination environment. In this manner, a transflective liquid crystal display may combine structures of the above-noted transmissive liquid crystal display and the reflective liquid crystal display.

Among liquid crystal displays, the transmissive or transflective liquid crystal displays that are configured to display images by using a backlight are mainly used because their display luminance is relatively higher than traditionally reflective liquid crystal displays.

It is noted, however, that about 50% of light radiating from a backlight and made incident on a polarizer is absorbed by the polarizer, which is typically coupled to a lower portion of a corresponding liquid crystal display. As such, the remaining about 50% of light may be used for displaying an image. As a result, light efficiency and display luminance may be less than acceptable.

Therefore, there is a need for an approach that provides efficient, cost effective techniques to provide liquid crystal display devices with improved light efficiency and display luminance.

The above information disclosed in this Background section is only for enhancement of understanding of the background of the invention, and therefore, it may contain information that does not form the prior art that is already known in this country to a person of ordinary skill in the art.

SUMMARY

Exemplary embodiments provide polarizers and liquid crystal displays including the same configured to increase light efficiency supplied from a backlight unit, and thereby, also increase display luminance.

Additional aspects will be set forth in the detailed description which follows and, in part, will be apparent from the disclosure, or may be learned by practice of the invention.

According to exemplary embodiments, a polarizer includes: a reflective polarizer main body including a repetitively laminated structure, the repetitively laminated structure comprising two layers of different refractive indices repetitively disposed on one another; and an Rth phase compensation layer disposed at one side of the reflective polarizer main body, the Rth phase compensation layer being configured to compensate for a phase difference in an Rth direction.

According to exemplary embodiments, a polarizer includes: at least one first repetitively laminated structure including two layers of different refractive indices repetitively disposed on one another; and a second repetitively laminated structure including two layers of different refractive indices repetitively disposed on one another. One of the at least one, first repetitively laminated structures is configured as a light incident surface of the polarizer and the second repetitively laminated structure is configured as a light dispersion surface of the polarizer. A thickness ratio or a component ration of the two layers of the at least one first repetitively laminated structure differs from a thickness ratio or a component ration of the two layers of the second repetitively laminated structure.

According to exemplary embodiments, a liquid crystal display includes: an upper panel including an upper polarizer configured as an absorptive polarizer, and an upper insulation substrate; a lower panel including a lower polarizer, and a lower insulation substrate; a liquid crystal layer disposed between the upper panel and the lower panel; and a backlight providing unit configured to supply light. The lower panel is disposed on the backlight providing unit. The lower polarizer includes: a reflective polarizer main body including a repetitively laminated structure, the repetitively laminated structure including two layers of different refractive indices repetitively disposed on one another, and an Rth phase compensation layer disposed at one side of the reflective polarizer main body, the Rth phase compensation layer being configured to compensate for a phase difference in an Rth direction.

According to exemplary embodiments, a liquid crystal display includes: an upper panel including an upper polarizer configured as an absorptive polarizer, and an upper insulation substrate; a lower panel including a lower polarizer, and a lower insulation substrate; a liquid crystal layer disposed between the upper panel and the lower panel; and a backlight providing unit configured to supply light. The lower panel is disposed on the backlight providing unit. The lower polarizer includes: at least one first repetitively laminated structure including two layers of different refractive indices repetitively disposed on one another, and a second repetitively laminated structure including two layers of different refractive indices repetitively disposed on one another. The second repetitively laminated structure is disposed closer to the liquid crystal layer than the at least one first repetitively laminated structure. A thickness ratio or a component ratio of the two layers of the at least one first repetitively laminated structure differs from a thickness ratio or a component ration of the two layers of the second repetitively laminated structure.

According to exemplary embodiments, a liquid crystal display includes: an upper panel including: an upper polarizer, and an upper insulation substrate; a lower panel including: a lower polarizer, and a lower insulation substrate; a liquid crystal layer disposed between the upper panel and the lower panel; and a backlight providing unit configured to supply light. The lower polarizer is disposed on the backlight providing unit. The lower polarizer includes a repetitively laminated structure including two layers of different refractive indices repetitively disposed on one another. The upper polarizer includes a C plate, the upper polarizer being configured as an absorptive polarizer.

According to exemplary embodiments, since some light may be transmitted and the rest of the light may be reflected via a repetitively formed multilayer structure including different refractive indices to recycle light supplied from a backlight unit, the efficiency of light use may be improved. As a result, a luminance improvement film typically used in the backlight unit may not be used. Further, according to exemplary embodiments, use of an Rth phase compensation layer in the reflective polarizer may eliminate (or at least reduce) issues associated with decreased viewing angles when the reflective polarizer is used. To this end, exemplary embodiments enable wider viewing angles. Further, according to exemplary embodiments, utilization of at least two repetitively laminated multilayer structures with different thickness ratios or component ratios, may eliminate (or at least reduce) interference colors.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF ILLUSTRATED EMBODIMENTS

Figure 1:
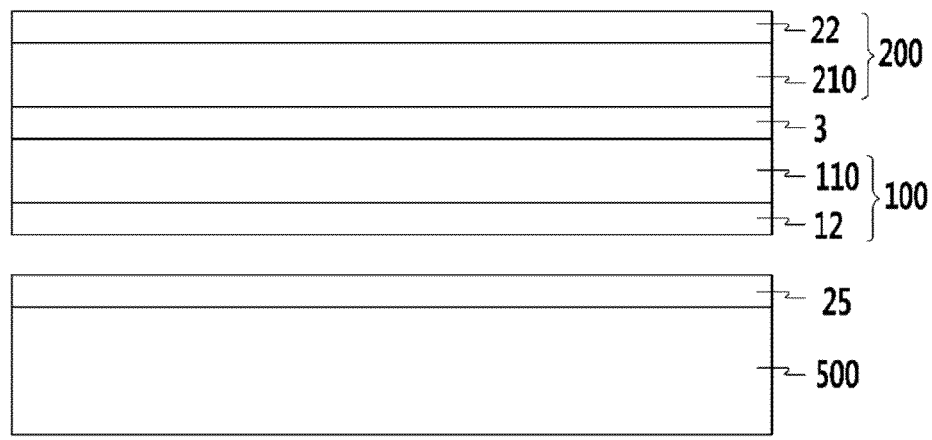
FIG. 1 is a cross-sectional view of a liquid crystal display, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or directly coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein interpreted accordingly.

The terminology used herein is for the purpose of describing particular embodiments and is not intended to be limiting.

As used herein, the singular forms, "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

While exemplary embodiments are described in association with a liquid crystal display device, it is contemplated that exemplary embodiments may be utilized in association with other or equivalent display devices, such as various self-emissive and/or non-self-emissive display technologies. For instance, self-emissive display devices may include organic light emitting displays (OLED), plasma display panels (PDP), etc., whereas non-self-emissive display devices may constitute liquid crystal displays (LCD), electrophoretic displays (EPD), electrowetting displays (EWD), and/or the like.

Figure 2:
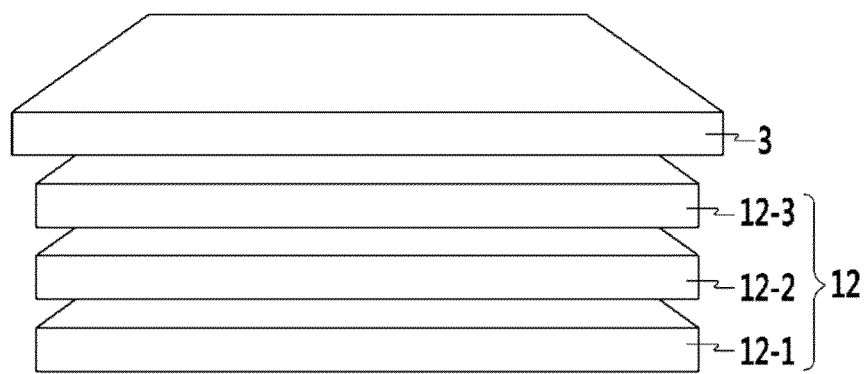
FIG. 2 is a cross-sectional view of a reflective polarizer, according to exemplary embodiments.
Figure 3:
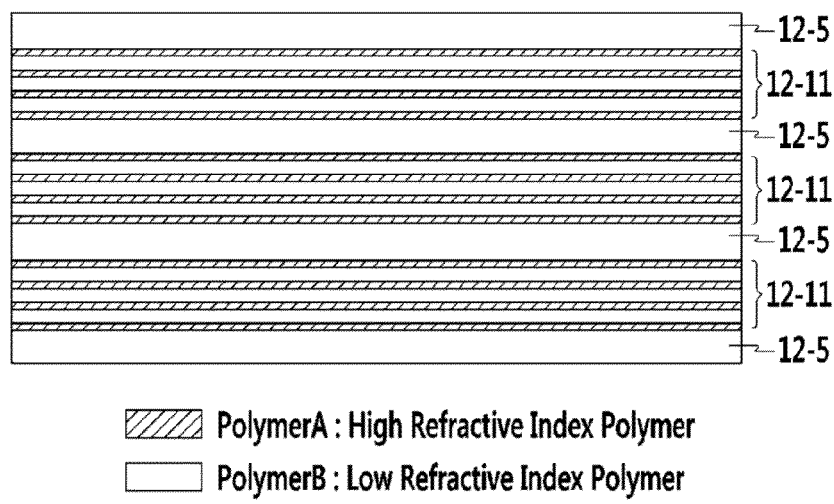
FIG. 3 is a cross-sectional view of a main body of a reflective polarizer, according to exemplary embodiments.
Figure 4:
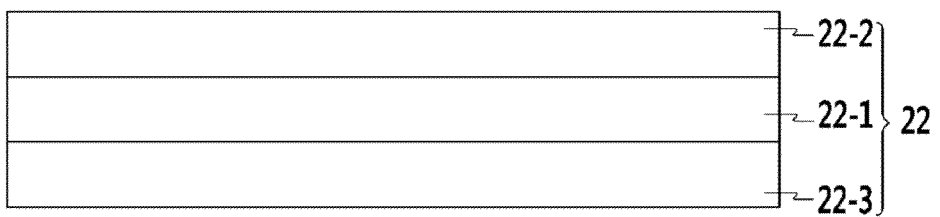
FIG. 4 is a cross-sectional view of an absorptive polarizer, according to exemplary embodiments.

FIG. 1 is a cross-sectional view of a liquid crystal display, according to exemplary embodiments. FIG. 2 is a cross-sectional view of a reflective polarizer, according to exemplary embodiments. FIG. 3 is a cross-sectional view of a main body of a reflective polarizer, according to exemplary embodiments. FIG. 4 is a cross-sectional view of an absorptive polarizer, according to exemplary embodiments.

According to exemplary embodiments, the liquid crystal display includes backlight unit 500, optical sheet 25, liquid crystal layer 3, lower panel 100, and upper panel 200.

While not illustrated, backlight unit 500 includes a light source, a light guide plate, and a reflector. Optical sheet 25 is disposed on backlight unit 500.

The configuration of backlight unit 500 enables light supplied from the light source to pass through the light guide plate and the reflector, and thereby, to be discharged upward from the backlight unit 500 and pass through the optical sheet 25 disposed on backlight unit 500. In this manner, the light may propagate through lower panel 100, liquid crystal layer 3, and upper panel 200.

According to exemplary embodiments, the light source may be (or otherwise include), for example, a fluorescent lamp (such as a cold-cathode fluorescent lamp (CCFL)), a light emitting diode (LED), and/or the like. The light source may be disposed on a side or a lower surface of the backlight unit 500.

The optical sheet 25 may include at least one optical sheet and may include a prism sheet including a prism structure or a diffusion film, such as a diffuser. In exemplary embodiments, the optical sheet 25 may not include a luminance improvement film that typically includes two layers having different refractive indices that are repetitively formed. Namely, because a lower polarizer 12 may be utilized that includes a repetitively laminated structure 12-11 that includes a multilayer (e.g., two layer) structure having different refractive indices repetitively formed, improved characteristics in luminance may be achieved without the use of a luminance improvement film associated with optical sheet 25.

As seen in FIG. 1, lower panel 100, liquid crystal layer 3, and upper panel 200 may be disposed on the backlight unit 500 and the optical sheet 25.

First, the lower panel 100 will be described.

According to exemplary embodiments, lower panel 100 may include a lower polarizer 12 and a lower insulation substrate 110. The lower polarizer 12 is coupled to the lower insulation substrate 110, which may be made of (or include) transparent glass or plastic.

The lower polarizer 12 may be a reflective polarizer, and may include a reflective polarizer main body 12-1 that includes a multilayer structure (e.g., two layers) having different refractive indices that are repetitively formed, and an Rth phase compensation layer 12-2.

The reflective polarizer main body 12-1 may include at least one repetitively laminated structure 12-11 in which, for example, two layers having different refractive indices are repetitively formed. As seen in FIG. 3, the reflective polarizer main body 12-1 may include, for instance, three repetitively laminated structures 12-11. It is contemplated; however, that repetitively laminated structure 12-11 may include any suitable number of repetitively formed layers, and reflective polarizer main body 12-1 may include any suitable number of the repetitively laminated structures 12-11.

According to exemplary embodiments, the repetitively laminated structure 12-11 may be a structure formed by repetitively laminating a first refractive index layer (e.g., polymer A) and a second refractive index layer (e.g., polymer B) upon one another. The number of total layers may be any suitable number, but in exemplary embodiments, the repetitively laminated structure 12-11 may be formed with, for instance, a total of 275 layers. Again, any suitable number of total layers may be utilized.

In exemplary embodiments, such as illustrated in FIG. 3, a thickness of the first refractive index layer (e.g., polymer A) may be smaller than a thickness of the second refractive index layer (e.g., polymer B). Further, the first refractive index layer may include a higher refractive index than the second refractive index layer. However, depending on the choice of materials utilized, the thickness of the first refractive index layer may be larger than the thickness of the second refractive index layer, the thicknesses may be the same as each other, and/or the first refractive index layer may have a smaller refractive index than the second refractive index layer. According to exemplary embodiments, each of the two layers used in the repetitively laminated structure 12-11 may have a different refractive index, and may have a difference in only a refractive index in one axial direction among three axial directions.

The reflective polarizer main body 12-1 may also include a buffer layer 12-5 disposed between repetitively laminated structures 12-11 and/or disposed on one or more of the outermost surfaces of the uppermost and lowermost repetitively laminated structures 12-11. The buffer layer 12-5 may be formed with one of the various layers (e.g., polymer B having a low refractive index) included in the repetitively laminated structure 12-11. The buffer layer 12-5 may be configured to protect, support, and/or connect the repetitively laminated structures 12-11.

According to exemplary embodiments, the Rth phase compensation layer 12-2 uses a triacetyl-cellulose (TAC) layer to compensate for a phase in an Rth direction. Since the TAC layer may have a retardation value of the Rth direction according to a thickness of the layer, when a phase value of the Rth direction to be compensated is determined, the TAC layer may be formed to a thickness depending on the determined phase value of the Rth phase compensation layer 12-2. In the case of forming the TAC layer to a thickness of 40 μm, the retardation value of the Rth direction may be provided as 40 nm. In the case of forming the TAC layer to a thickness of 60 μm, the retardation value of the Rth direction may be provided as 46 nm. It is contemplated, however, that the numerical values may be changed depending on a characteristic of the particular TAC layer being utilized, and in the case of using the TAC layer, as the thickness increases, the provided retardation value of the Rth direction increases.

According to exemplary embodiments, the lower polarizer 12 is coupled to the outer side of the lower insulation substrate 110, and includes an adhesive 12-3 for attachment. In FIG. 2, since only the layer providing the phase retardation is illustrated, the lower insulation substrate 110 is omitted.

Although not illustrated, a thin film transistor and a pixel electrode may be formed on an inner side of the lower insulation substrate 110. The thin film transistor and the pixel electrode may be formed in any one of various structures. An alignment layer (not shown) may be disposed on the pixel electrode.

Hereinafter, the upper panel 200 will be described.

According to exemplary embodiments, an upper polarizer 22 may be disposed on an upper insulation substrate 210 made of, for instance, transparent glass or plastic.

The upper polarizer 22 may include a structure as illustrated in FIG. 4 and may be an absorptive polarizer. That is, the upper polarizer 22, which is an absorptive polarizer, may include a TAC layer 22-2 is disposed on the upper surface of a polyvinyl alcohol (PVA) layer 22-1, and a biaxial compensation layer 22-3 may be disposed on the lower surface of the PVA layer 22-1. The biaxial compensation layer 22-3 is configured to provide phase retardation to improve display quality.

According to exemplary embodiments, the upper polarizer 22 may be coupled to an outer side of the upper insulation substrate 210. An outer surface of the TAC layer 22-2 of the upper polarizer 22 may be subjected to one or more surface treatments, such as one or more anti-glare or anti-reflection treatments.

While not illustrated, a light blocking member, a color filter, and a common electrode may be disposed on (or formed inside) the upper insulation substrate 210. According to exemplary embodiments, the light blocking member or the color filter may be formed inside the lower insulation substrate 110. An alignment layer (not shown) may be disposed below the common electrode.

A liquid crystal layer 3 may be disposed between the upper panel 200 and the lower panel 100.

The liquid crystal layer 3 may include liquid crystal molecules having positive dielectric anisotropy. That is, long axes of the liquid crystal molecules may be horizontal to the surfaces of lower and upper panels 100 and 200 when an electric field is not applied to the liquid crystal layer 3. To this end, when an electric field is applied by, for instance, the pixel electrode and the common electrode, an alignment direction of the liquid crystal molecules may be changed in a vertical direction, e.g., perpendicular or substantially perpendicular to the surfaces of the lower and upper panels 100 and 200. The liquid crystal layer 3 may use a twisted nematic (TN) mode liquid crystal.

As described above, the liquid crystal display uses a reflective polarizer having a phase compensation characteristic of an Rth direction as the lower polarizer 12. Generally, in the case of using a reflective polarizer without the phase compensation characteristic of an Rth direction, a viewing angle is decreased, but in the case of using the reflective polarizer having the phase compensation characteristic of the Rth direction, the viewing angle is not decreased. Here, the viewing angle is an angle at a position where a CR ratio is 10:1. The aforementioned maintenance of a suitably wide viewing angle was substantiated in an experiment, the results of which are shown in FIG. 5.

Figure 5:
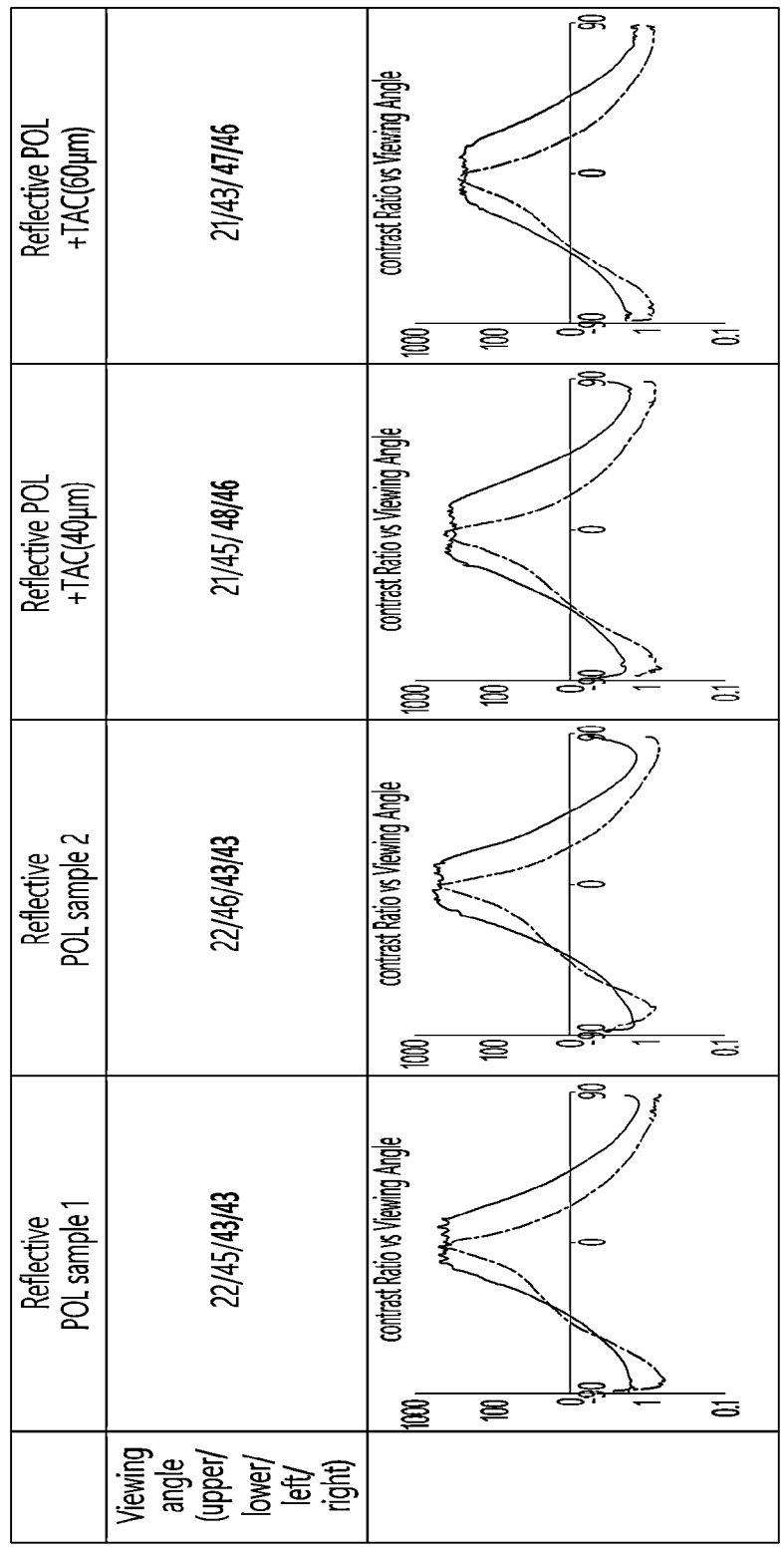
FIG. 5 is a diagram comparing viewing angle characteristics of a liquid crystal display, according to exemplary embodiments.

FIG. 5 is a diagram comparing viewing angle characteristics of a liquid crystal display, according to exemplary embodiments.

In FIG. 5, a reflective POL (polarizer) sample 1 and a reflective POL (polarizer) sample 2 are simulation results of a liquid crystal display using a reflective polarizer without the phase compensation characteristic of the Rth direction, and a reflective POL+TAC (40 μm) and a reflective POL+TAC (60 μm) are simulation results of a liquid crystal display that compensates for a phase of the Rth direction by the corresponding numerical value using the TAC layer as illustrated in FIG. 1.

As illustrated in FIG. 5, a viewing angle is not changed in a vertical direction, but in terms of compensating for the phase in the Rth direction, the viewing angle is increased by 3 to 5 degrees in a horizontal direction. As a result, the viewing angle of the TN mode liquid crystal layer 3 is increased so as to have a phase compensation characteristic of the Rth direction while using the reflective polarizer.

In FIG. 2, a TAC layer is utilized as the layer for compensating for the phase of the Rth direction.

However, another layer, in addition to the TAC layer, may be used as the layer for compensating for the phase of the Rth direction, which is shown and will be described in association with FIGS. 6 and 7.

Figure 6:
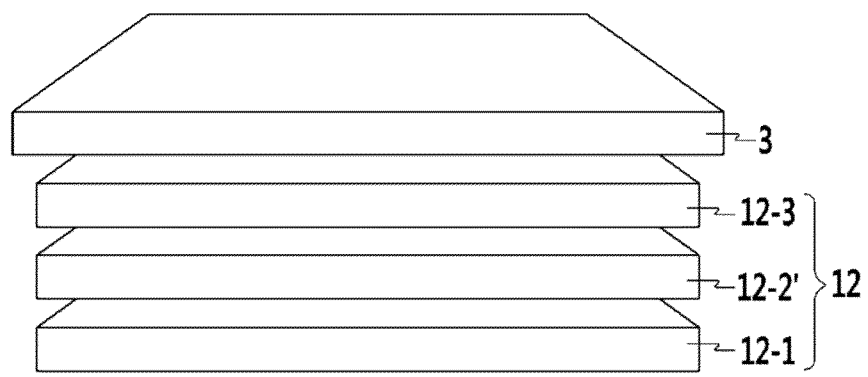
FIGS. 6 and 7 are cross-sectional views of a reflective polarizer and a liquid crystal layer, according to exemplary embodiments.
Figure 7:
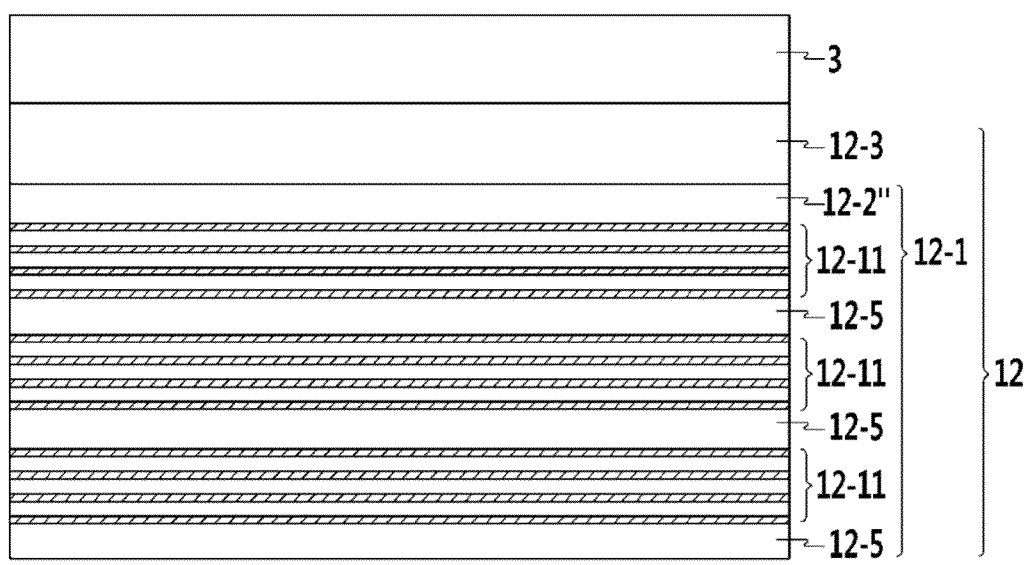

FIGS. 6 and 7 are cross-sectional views of a reflective polarizer and a liquid crystal layer, according to exemplary embodiments.

First, FIG. 6 illustrates utilization of a negative C plate as an Rth phase compensation layer 12-2', as opposed to the Rth phase compensation layer 12-2 shown in FIG. 2. According to exemplary embodiments, the negative C plate may correspond to an optical anisotropic film having a negative birefringence in its axial direction, i.e., in its thickness direction. Since the negative C plate may be configured to compensate for a phase of the Rth direction, there is an advantage in that the viewing angle is enlarged in the TN mode liquid crystal display utilized in association with the above-noted experiment, the results of which are shown in FIG. 5.

FIG. 7 illustrates the lower polarizer 12 without the Rth phase compensation layers 12-2 or 12-2', unlike as shown in association with FIGS. 2 and 6. As seen in FIG. 7, the Rth phase compensation layer 12-2 is not separately added, and an internal Rth phase compensation layer 12-2" configured to compensate for the phase of the Rth direction is formed in the reflective polarizer main body 12-1.

The reflective polarizer main body 12-1 of FIG. 7 will be described below.

The reflective polarizer main body 12-1 of FIG. 7 includes three repetitively laminated structures 12-11, in which, for instance, two layers having different refractive indices are repetitively formed upon one another. So long as the number of repetitively laminated structures 12-11 is one or more, it is sufficient, and the number may be different according to exemplary embodiments. A buffer layer 12-5 may be disposed between the repetitively laminated structures 12-11 and below the repetitively laminated structures 12-11. The buffer layer 12-5 may be formed by one of the various layers included in the repetitively laminated structure 12-11, such as polymer B having a lower refractive index. The buffer layer 12-5 may be configured to protect or connect the repetitively laminated structures 12-11.

Meanwhile, the internal Rth phase compensation layer 12-2" is formed above, for instance, the uppermost repetitively laminated structure 12-11; that is, disposed closest to the liquid crystal layer 3. The internal Rth phase compensation layer 12-2" may be formed by a TAC, a negative C plate, or a cyclo olefin polymer (COP).

According to exemplary embodiments, a buffer layer 12-5 may be added between the internal Rth phase compensation layer 12-2" and the uppermost repetitively laminated structure 12-11.

An adhesive 12-3 is disposed above the internal Rth phase compensation layer 12-2" to enable coupling to the lower insulation substrate 110.

In the lower polarizer 12, the reflective polarizer main body 12-1 includes the Rth phase compensation layer 12-2", the buffer layer 12-5 is disposed at the lower outer side of three repetitively laminated structures 12-11, and the Rth phase compensation layer 12-2" is disposed at the upper outer side.

In FIGS. 6 and 7, a structure between the lower polarizer 12 and the liquid crystal layer 3 is omitted because constituent elements supplying a phase difference to light are illustrated. However, it is noted that one or more constituent elements may be disposed on or among the various illustrated constituent elements.

According to exemplary embodiments, various additions and/or alternations may be utilized, such as will be described with reference to FIGS. 8-20.

It is generally noted that associated liquid crystal displays associated with FIGS. 8-20 have structures similar to the structure described in association with FIG. 1. Namely, liquid crystal displays associated with FIGS. 8-20 may include backlight unit 500, optical sheet 25, lower panel 100, liquid crystal layer 3, and upper panel 200.

While not illustrated, backlight unit 500 includes a light source, a light guide plate, and a reflector. Optical sheet 25 is disposed on backlight unit 500.

The configuration of backlight unit 500 enables light supplied from the light source to pass through the light guide plate and the reflector, and thereby, to be discharged upward from the backlight unit 500 and pass through the optical sheet 25 disposed on backlight unit 500. In this manner, the light may propagate through lower panel 100, liquid crystal layer 3, and upper panel 200.

According to exemplary embodiments, the light source may be (or otherwise include), for example, a fluorescent lamp (such as a CCFL), a LED, and/or the like. The light source may be disposed on a side or a lower surface of the backlight unit 500.

The optical sheet 25 may include at least one optical sheet and may include a prism sheet including a prism structure or a diffusion film, such as a diffuser. In exemplary embodiments, the optical sheet 25 may not include a luminance improvement film that typically includes two layers having different refractive indices that are repetitively formed. Namely, because a lower polarizer 12 may be included that includes a repetitively laminated structure 12-11 that includes a multilayer (e.g., two layer) structure having different refractive indices repetitively formed, improved characteristics in luminance may be achieved without the use of a luminance improvement film associated with optical sheet 25.

Lower panel 100, liquid crystal layer 3, and upper panel 200 may be disposed on the backlight unit 500 and the optical sheet 25.

First, the lower panel 100 will be described.

According to exemplary embodiments, lower panel 100 may include a lower polarizer 12 and a lower insulation substrate 110. The lower polarizer 12 is coupled to the lower insulation substrate 110, which may be made of (or include) transparent glass or plastic.

The lower polarizer 12 may be a reflective polarizer, and may include at least two repetitively laminated structures 12-11 and 12-12, in which, for example, two layers having different refractive indices are repetitively formed. Hereinafter, the repetitively laminated structures will be referred to as a first repetitively laminated structure 12-11 and a second repetitively laminated structure 12-12. In the first repetitively laminated structure 12-11 and the second repetitively laminated structure 12-12, two layers having different refractive indices may be repetitively formed upon one another, but the higher refractive index layer in the first repetitively laminated structure 12-11 and the higher refractive index layer in the second repetitively laminated structure 12-12 may be configured to provide different phase differences. Alternatively, the lower refractive index layer in the first repetitively laminated structure 12-11 and the lower refractive index layer in the second repetitively laminated structure 12-12 may be configured to provide different phase differences. In this case, the lower refractive index layer in the first repetitively laminated structure 12-11 and the lower refractive index layer in the second repetitively laminated structure 12-12 may provide the same phase difference, or the higher refractive index layer in the first repetitively laminated structure 12-11 and the higher refractive index layer in the second repetitively laminated structure 12-12 may provide the same phase difference.

That is, since at least one of the phase differences between two layers in the first repetitively laminated structure 12-11 and the phase difference between two layers in the second repetitively laminated structure 12-12 is different, the first repetitively laminated structure 12-11 and the second repetitively laminated structure 12-12 may have different optical characteristics.

It is noted that any suitable method may be utilized to differently form at least one of the phase differences between two layers in the first repetitively laminated structure 12-11 and the phase differences between two layers in the second repetitively laminated structure 12-12. That is, the phase differences may be different from each other by using different materials configuring the corresponding layers, or the materials configuring the corresponding layer are the same as each other, but the phase differences may be differently provided according to different thicknesses of the layers. Further, the phase differences may be differently set by changing a component ratio of the material configuring the corresponding layers.

Figure 8:
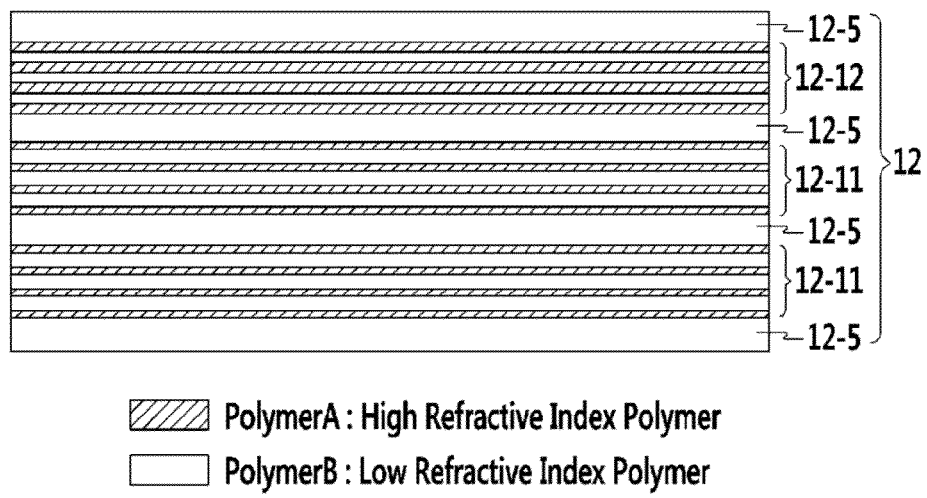
FIG. 8 is a cross-sectional view of a reflective polarizer, according to exemplary embodiments.

As seen in FIG. 8, the higher refractive index layer and the lower refractive index layer may be formed by the same polymer—but have different phase differences by differently forming the thicknesses of the corresponding layers.

FIG. 8 is a cross-sectional view of a reflective polarizer, according to exemplary embodiments.

As seen in FIG. 8, the lower polarizer 12 is a reflective polarizer, and includes two first repetitively laminated structures 12-11, one second repetitively laminated structure 12-12, and a plurality of buffer layers 12-5 disposed therebetween, as well as disposed on the outermost surfaces of the lower polarizer.

In the first repetitively laminated structure 12-11 and the second repetitively laminated structure 12-12, two layers having different refractive indices may be repetitively formed upon one another. The first repetitively laminated structure 12-11 and the second repetitively laminated structure 12-12 have different optical characteristics. To this end, phase differences of at least one corresponding layer configuring the first repetitively laminated structure 12-11 and the second repetitively laminated structure 12-12 may be different from each other.

That is, the first repetitively laminated structure 12-11 and the second repetitively laminated structure 12-12 may not be formed by different materials. In other words, the first repetitively laminated structure 12-11 and the second repetitively laminated structure 12-12 may be formed using polymer A as the first refractive index layer and polymer B as the second refractive index layer. However, as illustrated in FIG. 8, the second refractive index layer (i.e., polymer B) may be thicker than the first refractive index layer (i.e., polymer A) in the first repetitively laminated structure 12-11. In the second repetitively laminated structure 12-12, however, the second refractive index layer (i.e., polymer B) and the first refractive index layer (i.e., polymer A) may be formed to the same thickness. It is noted, however, that the first refractive index layer and the second refractive index layer may be different from each other in only a refractive index with respect to one axial direction among three axial directions.

As such, since the thickness relationship between the first refractive index layer and the second refractive index layer is different, phase retardations occurring as a result of the configuration of the layers are different from each other, and accordingly, optical characteristics are different from each other.

It is also noted that, as seen in FIG. 8, the number of total layers included in the first repetitively laminated structure 12-11 and the second repetitively laminated structure 12-12 is the same, and the total thicknesses are the same as each other. However, according to exemplary embodiments, the total number of layers (e.g., 275 layers) may be different from each other, and the total thicknesses may be different from each other.

According to exemplary embodiments, two first repetitively laminated structures 12-11 may be disposed at the lower portion of lower polarizer 12, and one second repetitively laminated structure 12-12 may be disposed at an upper portion of the lower polarizer 12. Here, the first repetitively laminated structure 12-11 has a reflective polarization characteristic. That is, a partial polarization of light supplied from the backlight unit 500 may be reflected, and the rest of the light may be transmitted. The second repetitively laminated structure 12-12, however, may include a reflective polarization characteristic, but may include a compensation film characteristic. That is, light passing through the two first repetitively laminated structures 12-11 at the lower portion of lower polarizer 12 may be light of a predetermined polarization component. When the light is incident on the second repetitively laminated structure 12-12, since the light meets with a multilayered structure having a different refractive index than the first repetitively laminated structure 12-11, an additional phase retardation may result and have the same effect as the compensation film. Therefore, the first repetitively laminated structure 12-11 may be formed with one layer, but may be formed with two or more layers in order to improve the reflective polarization characteristics. Further, the first repetitively laminated structure 12-11 may be continuously formed at a side where the light from the backlight unit 500 is made incident. Since the light incident to the second repetitively laminated structure 12-12 may serve to provide an additional phase difference (phase retardation) as compared with the reflective polarization, one second repetitively laminated structure 12-12 may be formed and disposed closer to the liquid crystal layer 3 than the first repetitively laminated structures 12-11. According to exemplary embodiments, in order to provide sufficient phase retardation, two or more second repetitively laminated structures 12-12 may be formed at the upper portion of the lower polarizer 12.

According to exemplary embodiments, a plurality of buffer layers 12-5 may be respectively disposed between adjacent repetitively laminated structures 12-11 and/or 12-12, as well as disposed on the outermost surfaces of the outermost repetitively laminated structures 12-11 and 12-12. The plurality of buffer layers 12-5 may be formed from one layer (e.g., polymer B having the lower refractive index) among the various layers included in the repetitively laminated structures 12-11 and 12-12. Each buffer layer 12-5 may be configured to protect or connect the repetitively laminated structures 12-11 and 12-12.

Referring back to FIG. 1, the lower polarizer 12 is coupled to the outer side of the lower insulation substrate 110, and may include an adhesive 12-3 for attachment.

Although not illustrated, a thin film transistor and a pixel electrode may be disposed on an inner side of the lower insulation substrate 110. The thin film transistor and the pixel electrode may be formed in any one of various structures. An alignment layer (not shown) may be formed on the pixel electrode.

Hereinafter, the upper panel 200 will be described.

According to exemplary embodiments, the upper polarizer 22 may be disposed on an upper insulation substrate 210 made of, for instance, transparent glass or plastic.

The upper polarizer 22 may include a structure as illustrated in FIG. 4 and may be an absorptive polarizer. That is, the upper polarizer 22, which is an absorptive polarizer, may include a TAC layer 22-2 disposed on the upper surface of a PVA layer 22-1, and a biaxial compensation layer 22-3 may be disposed positioned on the lower surface of the PVA layer 22-1. The biaxial compensation layer 22-3 is configured to provide phase retardation to improve display quality.

According to exemplary embodiments, the upper polarizer 22 may be coupled to an outer side of the upper insulation substrate 210. An outer surface of the TAC layer 22-2 of the upper polarizer 22 may be subjected to one or more surface treatments, such as one or more anti-glare or anti-reflection treatments.

While not illustrated, a light blocking member, a color filter, and a common electrode may be disposed on (or formed inside) the upper insulation substrate 210. According to exemplary embodiments, at least one of the light blocking member, the color filter, and the common electrode may be formed inside the lower insulation substrate 110. An alignment layer (not shown) may be disposed below the common electrode.

A liquid crystal layer 3 may be disposed between the upper panel 200 and the lower panel 100.

The liquid crystal layer 3 may have negative dielectric anisotropy and may include liquid crystal molecules that, in a vertically aligned mode, have long axes vertical to the surfaces of panels 100 and 200 when an electric field is not applied, and which are aligned in a vertical direction to the electric field when the electric field is applied by the pixel electrode and the common electrode. Additionally or alternatively, the liquid crystal molecules may be of an in-plane switching (IPS) type and/or of a plane to line switching (PLS) type that have their long axes horizontal to the surfaces of panels 100 and 200 when an electric field is not applied to the liquid crystal layer 3, and that rotate in a horizontal surface according to a horizontal electric field applied by the pixel electrode and the common electrode.

As such, a liquid crystal display according to exemplary embodiments may include a lower polarizer 12 that is formed as a reflective polarizer and at least two repetitively laminated structures having different optical characteristics in the lower polarizer 12. As a result, an interference colors typically caused at a side of a display panel that are generated when only the repetitively laminated structures having the same optical characteristic are used in the lower polarizer 12 may be avoided.

The above-noted interference colors and avoidance thereof is described in more detail in association with FIGS. 9-12.

FIGS. 9-12 are diagrams of display characteristics of a liquid crystal display, according to exemplary embodiments.

Figure 9:
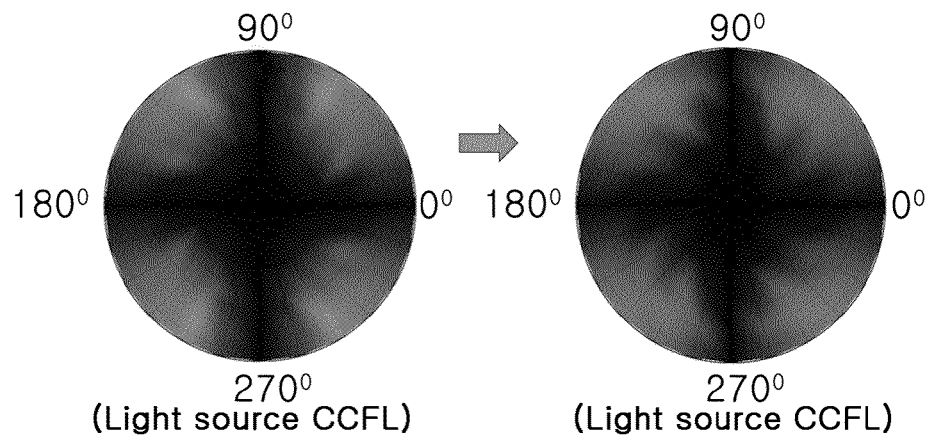
FIGS. 9-12 are diagrams of display characteristics of a liquid crystal display, according to exemplary embodiments.
Figure 9:
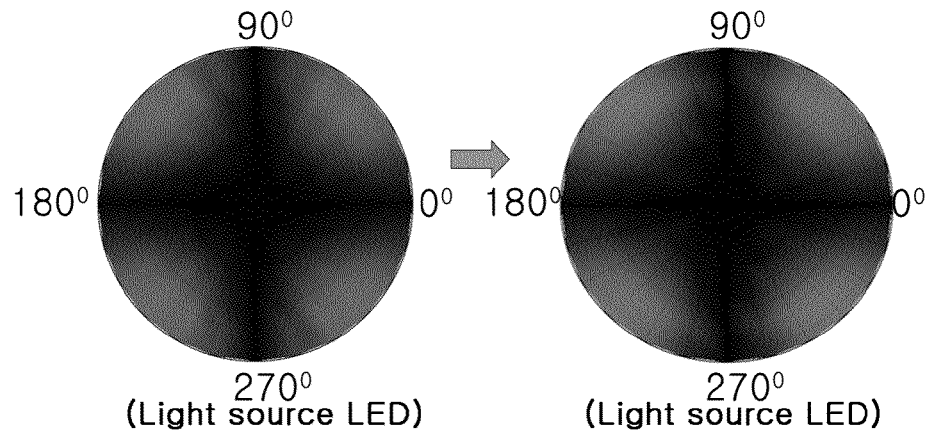

FIG. 9 provides display characteristics associated with a liquid crystal display utilizing a CCFL as a light source, which are illustrated in the first row, and display characteristics associated with a liquid crystal display utilizing a LED as the light source, which are illustrated in the second row. Further, Comparative Examples in which only the repetitively laminated structures having the same optical characteristic are used in the lower polarizer 12 are illustrated in a left column, and the Examples in which at least two repetitively laminated structures having different optical characteristics are used according to exemplary embodiments are illustrated in a right column. It is noted that the liquid crystal display associated with the right column results was configured as described in association with FIG. 8.

In the case of using the CCFL as the light source, it was verified that a lot of interference colors were generated as compared with the case of using the LED as the light source. It was also verified that when at least two repetitively laminated structures having different optical characteristics are used in the lower polarizer 12, the interference colors were prevented.

Figure 10:
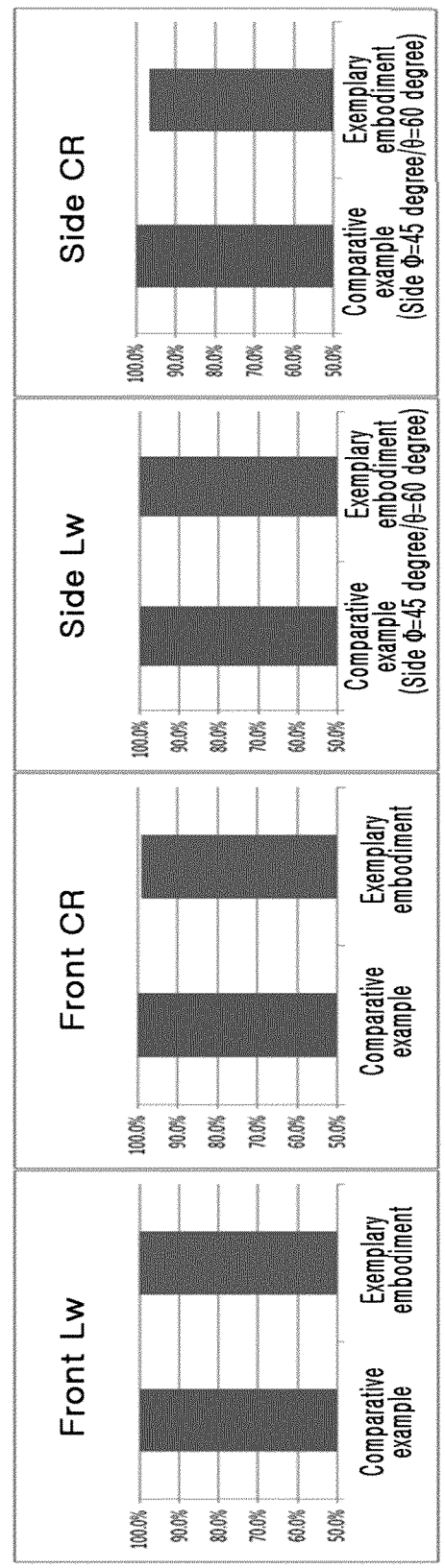
Figure 11:
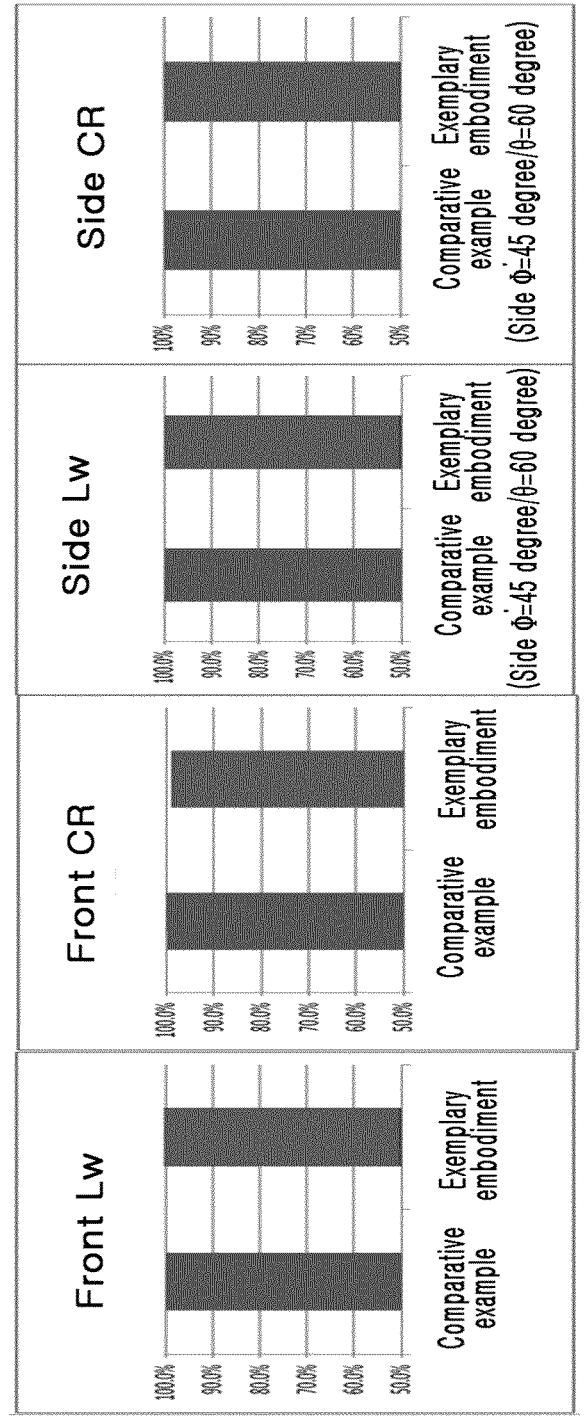

In FIGS. 10 and 11, in the case of the Comparative Examples and the Examples according to exemplary embodiments associated with FIG. 8, front white luminance (front Lw), a front CR, side white luminance (side Lw), and a side CR are compared with each other, and FIG. 10 illustrates the case of using the LED as the light source, and FIG. 11 illustrates the case of using the CCFL as the light source.

As can be seen in comparing FIGS. 10 and 11, the liquid crystal displays according to exemplary embodiments associated with FIG. 8, the side or front CR was slightly decreased as compared with the Comparative Examples, but the decrease was not substantial enough to cause a noticeable problem for users. Accordingly, when at least two repetitively laminated structures having different optical characteristics were used in the lower polarizer 12, display quality was not deteriorated.

Figure 12:
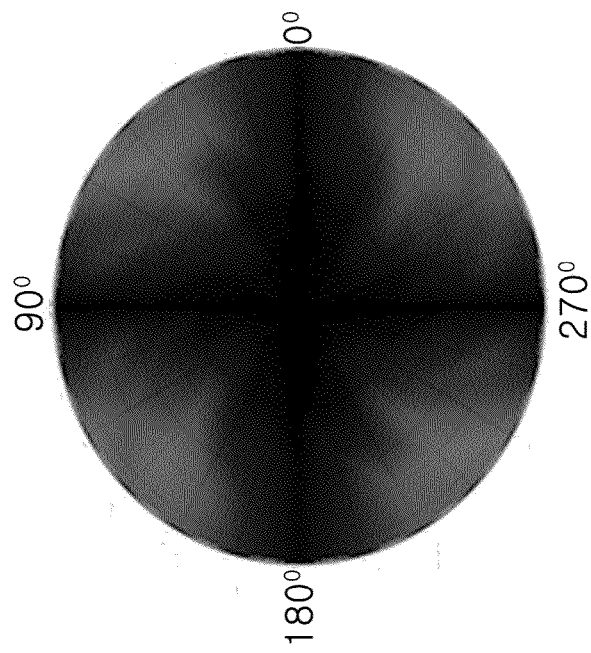
Figure 12:
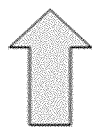
Figure 12:
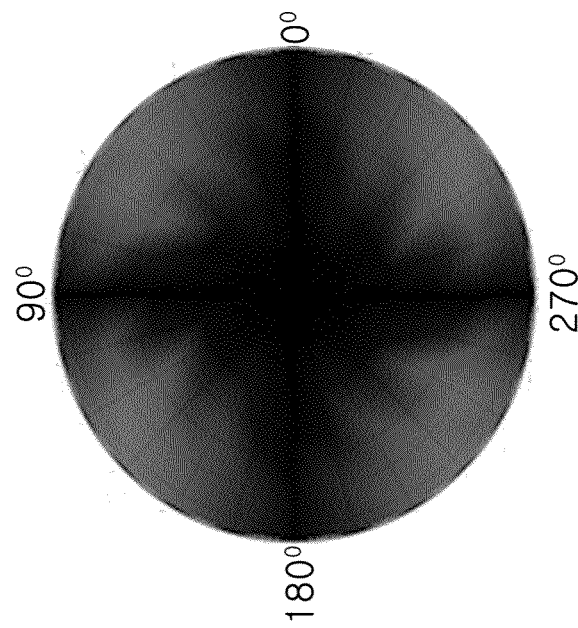

In FIG. 12, unlike the exemplary embodiments associated with FIG. 8 (i.e., the left drawing associated with the Comparative Example) and FIG. 8, a characteristic according to viewing angles of the exemplary embodiments associated with FIG. 8 (i.e., the right drawing) in which all of the three repetitively laminated structures of the lower polarizer 12 are formed as the repetitively laminated structure 12-12 is illustrated. In this case, the light source used the CCFL. The CCFL was chosen for demonstration because it typically is associated with large interference color problems.

As illustrated in FIG. 12, the display characteristics of the two cases are almost similar to each other, but in the right drawing, portions where the interference colors are clearly shown exist at 90 degrees and 270 degrees. It was verified that when three second repetitively laminated structures 12-12 were formed, a portion that supplied the phase difference did not exist like the compensation film, and as a result, it was difficult to reduce the interference colors. Further, it was verified that the portion that supplied the phase difference was a layer that was closest to the liquid crystal layer 3.

Hereinafter, interference colors according to thicknesses (or component ratios) of the first refractive index layer and the second refractive index layer will be described with reference to FIGS. 13 and 14.

Figure 13:
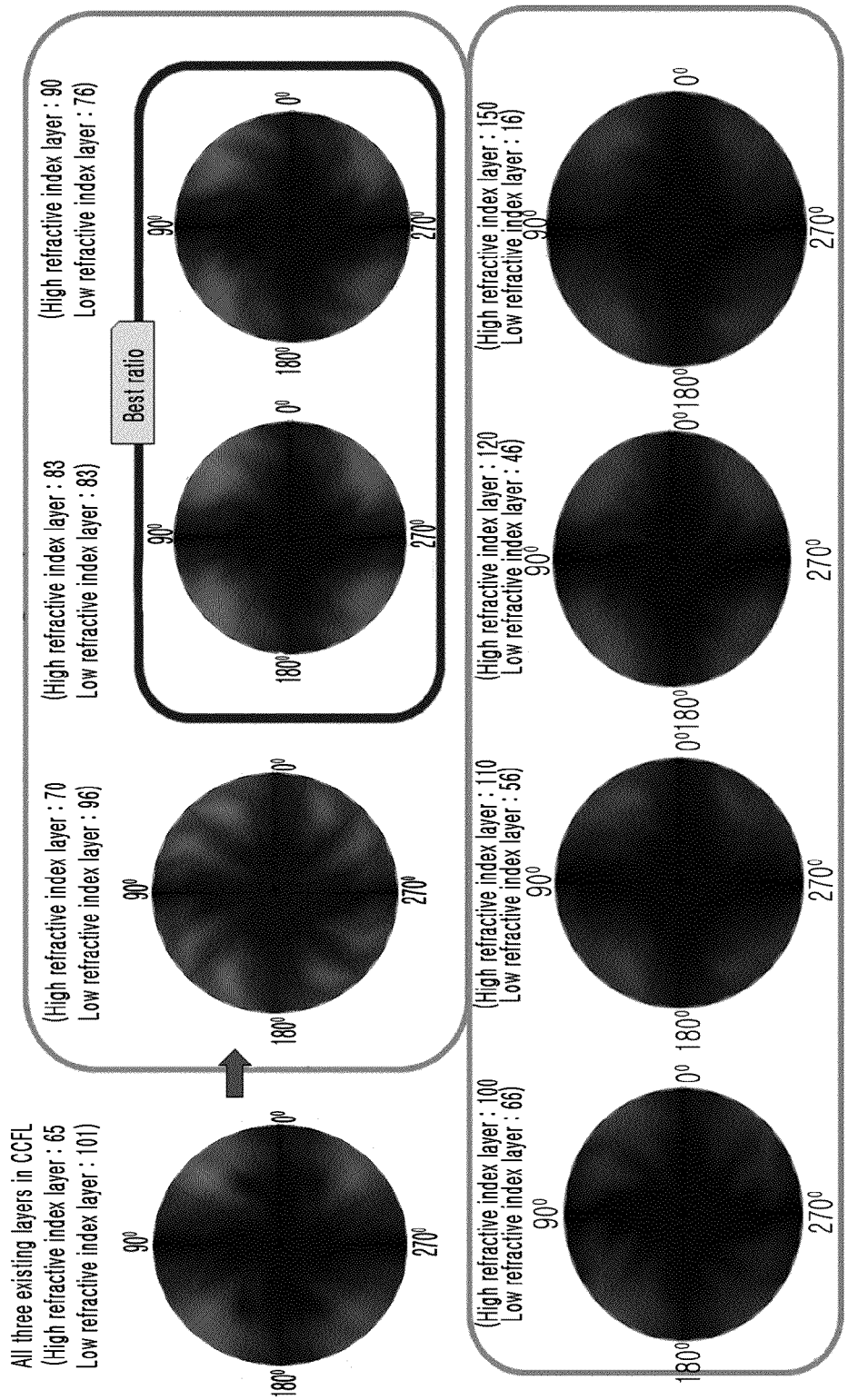
FIGS. 13 and 14 are diagrams of display characteristics of a liquid crystal display, according to exemplary embodiments.
Figure 14:
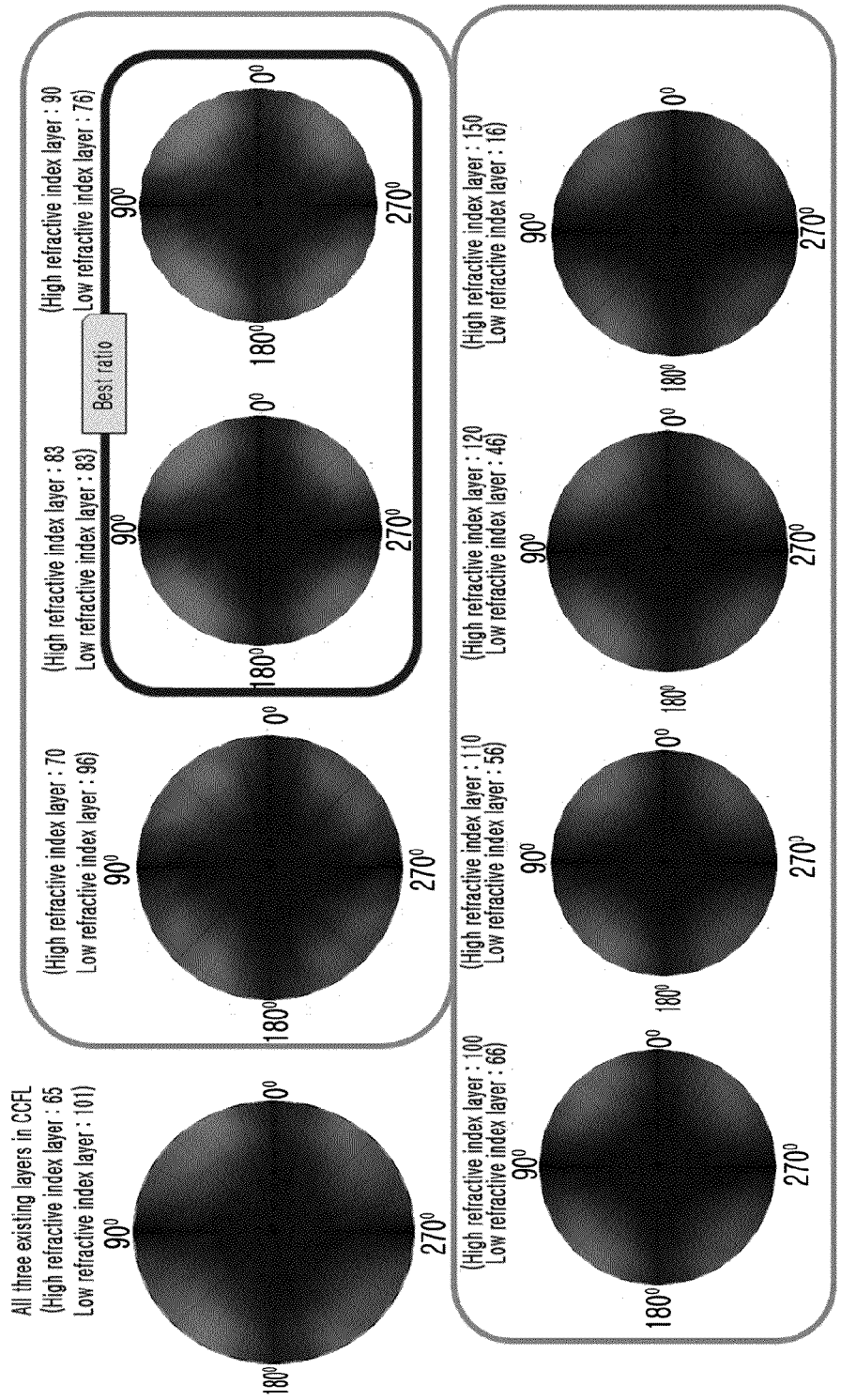

FIGS. 13 and 14 are diagrams of display characteristics of a liquid crystal display, according to exemplary embodiments.

FIG. 13 illustrates a case of using a CCFL as a light source. The drawing positioned at the leftmost side of the first row illustrates a Comparative Example in which three first repetitively laminated structures 12-11 are disposed in the lower polarizer 12, and the first repetitively laminated structure 12-11 is a case where a thickness ratio (or component ratio) between the first refractive index layer and the second refractive index layer is 65:101. Even in other Examples of FIG. 13, the thickness ratio (or component ratio) of the first repetitively laminated structure 12-11 is the same as above.

The other drawings of FIG. 13 are drawings in which the second repetitively laminated structure 12-12 is included as associated with the exemplary embodiments of FIG. 8, and the display characteristics are described while changing the thickness ratio (or component ratio) between the first refractive index layer and the second refractive index layer.

The drawing of the second column of the first row illustrates that the thickness ratio (or component ratio) between the first refractive index layer and the second refractive index layer in the second repetitively laminated structure 12-12 is 70:96, the drawing of the third column of the first row illustrates that the thickness ratio (or component ratio) between the first refractive index layer and the second refractive index layer in the second repetitively laminated structure 12-12 is 83:83, and the drawing of the fourth column of the first row illustrates that the thickness ratio (or component ratio) between the first refractive index layer and the second refractive index layer in the second repetitively laminated structure 12-12 is 90:76. The drawing of the first column of the second row illustrates that the thickness ratio (or component ratio) between the first refractive index layer and the second refractive index layer in the second repetitively laminated structure 12-12 is 100:66, the drawing of the second column of the second row illustrates that the thickness ratio (or component ratio) between the first refractive index layer and the second refractive index layer in the second repetitively laminated structure 12-12 is 110:56, the drawing of the third column of the second row illustrates that the thickness ratio (or component ratio) between the first refractive index layer and the second refractive index layer in the second repetitively laminated structure 12-12 is 120:46, and the drawing of the fourth column of the second row illustrates that the thickness ratio (or component ratio) between the first refractive index layer and the second refractive index layer in the second repetitively laminated structure 12-12 is 150:16.

As illustrated in FIG. 13, it was verified that all the interference colors were improved in other drawings as compared with the Comparative Example disposed at the first column of the first row. Since a value of the thickness (or component ratio) of the first refractive index layer divided by the thickness (or component ratio) of the second refractive index layer is 0.6435, a value of the thickness (or component ratio) of the first refractive index layer divided by the thickness (or component ratio) of the second refractive index layer (hereinafter, simply referred to as a thickness ratio or component ratio) in the second repetitively laminated structure 12-12 is 0.644 or more, and in some exemplary embodiments, may be more than 1. In the case of the fourth column of the second row in FIG. 13, the value may be more than 9.375.

In FIG. 13, the case of the most improved interference color is the case of the third column and the fourth column of the first row, and in this case, the range of the thickness ratio or the component ratio may be 1 to 1.184.

Hereinafter, a case where the light source is an LED will be described with reference to FIG. 14.

The drawing positioned at the leftmost side of the first row illustrates the Comparative Example in which three first repetitively laminated structures 12-11 are positioned in the lower polarizer 12, and the first repetitively laminated structure 12-11 is a case where a thickness ratio (or component ratio) between the first refractive index layer and the second refractive index layer is 65:101. In the other Examples of FIG. 14, the thickness ratio (or component ratio) of the first repetitively laminated structure 12-11 is the same as above.

The other drawings of FIG. 14 are drawings in which the second repetitively laminated structure 12-12 is included as associated with the exemplary embodiments of FIG. 8, and the display characteristics are described while changing the thickness ratio (or component ratio) between the first refractive index layer and the second refractive index layer.

The drawing of the second column of the first row illustrates that the thickness ratio (or component ratio) between the first refractive index layer and the second refractive index layer in the second repetitively laminated structure 12-12 is 70:96, the drawing of the third column of the first row illustrates that the thickness ratio (or component ratio) between the first refractive index layer and the second refractive index layer in the second repetitively laminated structure 12-12 is 83:83, and the drawing of the fourth column of the first row illustrates that the thickness ratio (or component ratio) between the first refractive index layer and the second refractive index layer in the second repetitively laminated structure 12-12 is 90:76. The drawing of the first column of the second row illustrates that the thickness ratio (or component ratio) between the first refractive index layer and the second refractive index layer in the second repetitively laminated structure 12-12 is 100:66, the drawing of the second column of the second row illustrates that the thickness ratio (or component ratio) between the first refractive index layer and the second refractive index layer in the second repetitively laminated structure 12-12 is 110:56, the drawing of the third column of the second row illustrates that the thickness ratio (or component ratio) between the first refractive index layer and the second refractive index layer in the second repetitively laminated structure 12-12 is 120:46, and the drawing of the fourth column of the second row illustrates that the thickness ratio (or component ratio) between the first refractive index layer and the second refractive index layer in the second repetitively laminated structure 12-12 is 150:16.

As illustrated in FIG. 14, it was verified that all the interference colors were improved in the other drawings as compared with the Comparative Example disposed at the first column of the first row. Since a value of the thickness (or component ratio) of the first refractive index layer divided by the thickness (or component ratio) of the second refractive index layer is 0.6435, a value of the thickness (or component ratio) of the first refractive index layer divided by the thickness (or component ratio) of the second refractive index layer (hereinafter, simply referred to as a thickness ratio or component ratio) in the second repetitively laminated structure 12-12 is 0.644 or more, and in some exemplary embodiments, may be more than 1. In the case of the fourth column of the second row in FIG. 14, the value may be more than 9.375.

In FIG. 14, the most improved interference color is the case of the third column and the fourth column of the first row, and in this case, the range of the thickness ratio or the component ratio may be 1 to 1.184.

Referring to FIGS. 13 and 14, in the first repetitively laminated structure 12-11 and the second repetitively laminated structure 12-12, the thicknesses of the first refractive index layer and the second refractive index layer may be reversed. That is, in the Comparative Examples of FIGS. 13 and 14, the thickness of the second refractive index layer is increased in the first repetitively laminated structure 12-11, but in the other Examples, the thickness of the second refractive index layer is decreased in the second repetitively laminated structure 12-12.

In FIGS. 13 and 14, in a state where the combined thickness of the first refractive index layer and the second refractive index layer is set to be constant, an experiment was performed while changing the thickness ratio/component ratio. However, the combined thickness of the first refractive index layer and the second refractive index layer may be different in the first repetitively laminated structure 12-11 and the second repetitively laminated structure 12-12, and the entire thickness of the first repetitively laminated structures 12-11 may be different from the entire thickness of the second repetitively laminated structures 12-12.

Figure 15:
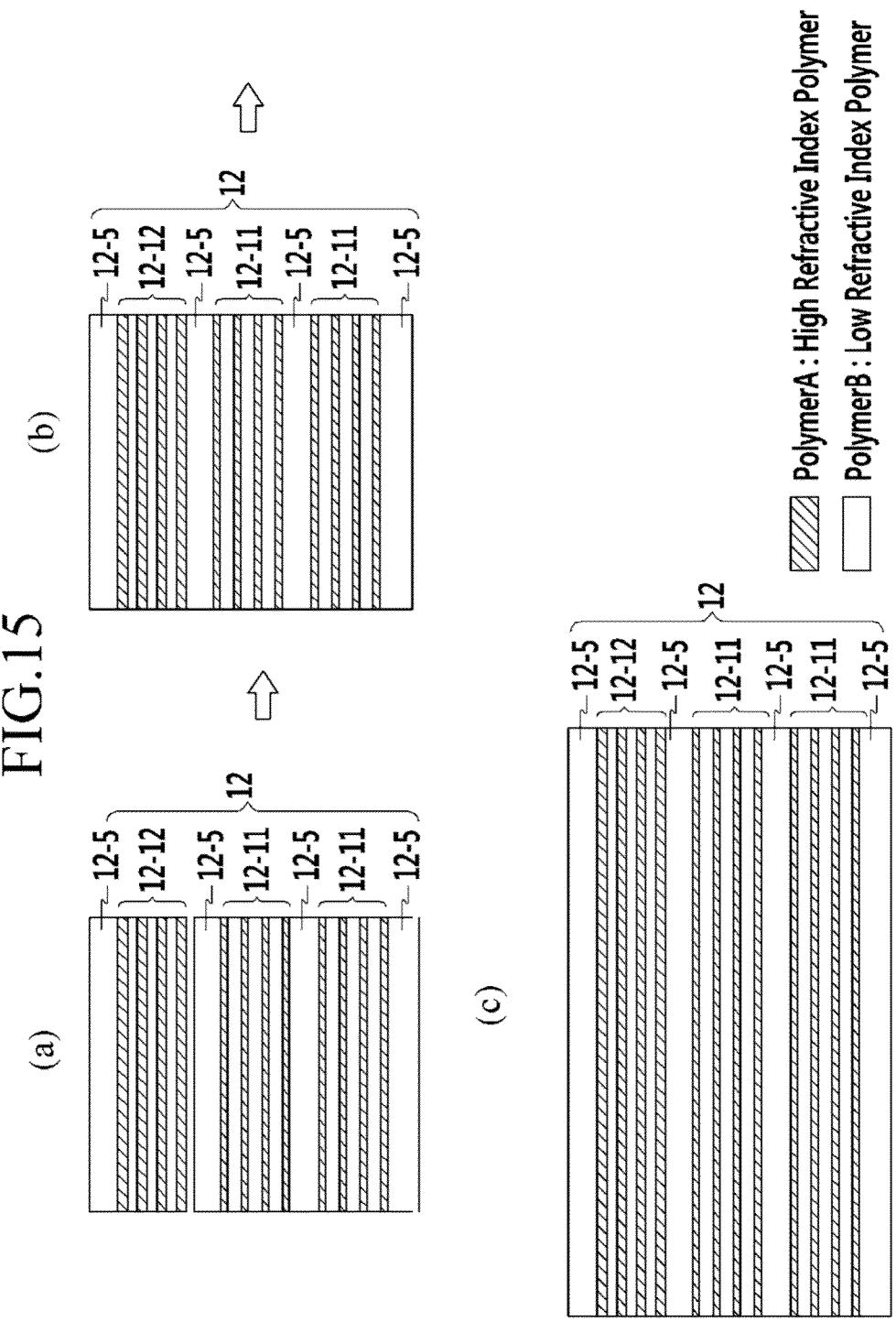
FIG. 15 is a diagram of a manufacturing method of the reflective polarizer of FIG. 8, according to exemplary embodiments.

FIG. 15 is a diagram of a manufacturing method of the reflective polarizer of FIG. 8, according to exemplary embodiments.

First, two first repetitively laminated structures 12-11 where the first refractive index layer and the second refractive index layer are repetitively laminated and the buffer layer 12-5 disposed between and outside the first repetitively laminated structures 12-11 are sequentially laminated according to a thickness ratio (or component ratio) of the first repetitively laminated structures 12-11, as can be seen in FIG. 15A.

Further, as illustrated at the top of FIG. 15A, the second repetitively laminated structure 12-12 where the first refractive index layer and the second refractive index layer are repetitively laminated and the buffer layer 12-5 is disposed at one side of the second repetitively laminated structure are sequentially laminated according to a thickness ratio (or component ratio) of the second repetitively laminated structures 12-12.

Thereafter, as illustrated in FIG. 15B, the portion including the second repetitively laminated structure 12-12 is laminated at the upper side of the portion including the first repetitively laminated structure 12-11.

Thereafter, as illustrated in FIG. 15C, the lower polarizer 12 is completed by stretching the structure in one direction.

While the stretching method has been described, it is noted that exemplary embodiments are not so limited and any other suitable method to elongate the resultant structure may be utilized, which may include forming the resultant structure in the desired dimensions.

It is noted that the exemplary embodiments may be modified in various manners, some of which will be described in association with FIGS. 16 and 17.

Figure 16:
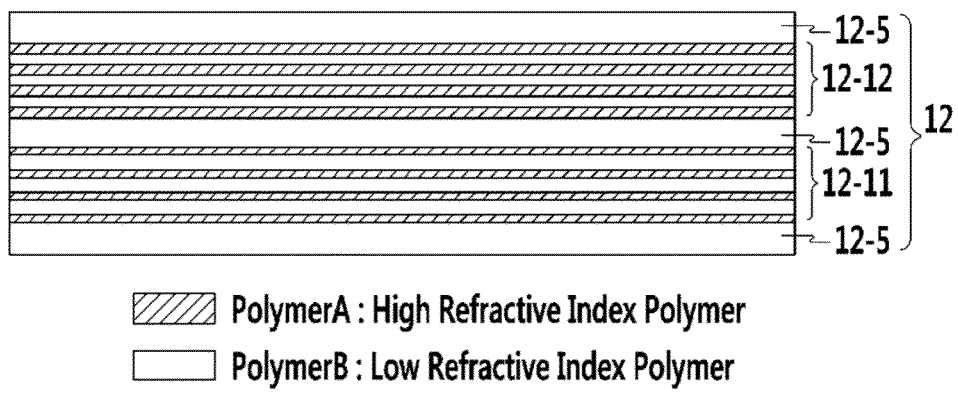
FIG. 16 is a cross-sectional view of a reflective polarizer, according to exemplary embodiments.

FIG. 16 is a cross-sectional view of a reflective polarizer, according to exemplary embodiments.

As seen in FIG. 16, only one first repetitively laminated structure 12-11 is used unlike as illustrated in FIG. 8. As a result, the number of buffer layers 12-5 is reduced as compared with the illustration of FIG. 8.

Although only one first repetitively laminated structure 12-11 is used, the exemplary embodiment of FIG. 16 may be applied to a liquid crystal display, which may be used in the case where a reflective polarization characteristic is good, or may be used in the case where the reflective polarization characteristic is bad.

According to exemplary embodiments, the number of total layers in the first repetitively laminated structure 12-11 of FIG. 16 may be different form the number of total layers of the first repetitively laminated structure 12-11 as illustrated in FIG. 8. In exemplary embodiments, more layers may be included in the exemplary embodiments of FIG. 16.

Figure 17:
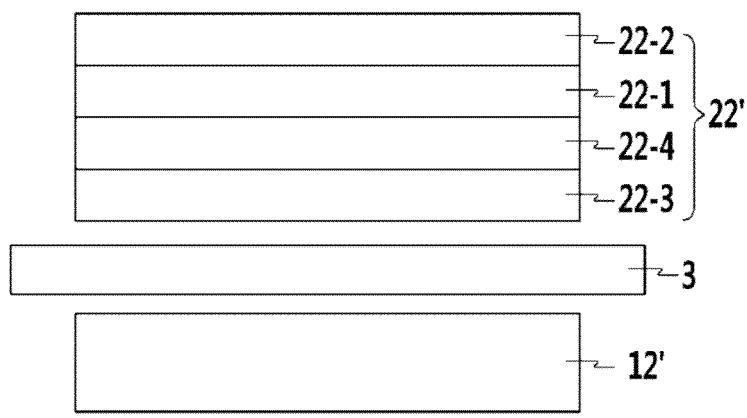
FIG. 17 is a cross-sectional view of a liquid crystal display, according to exemplary embodiments.
Figure 18:
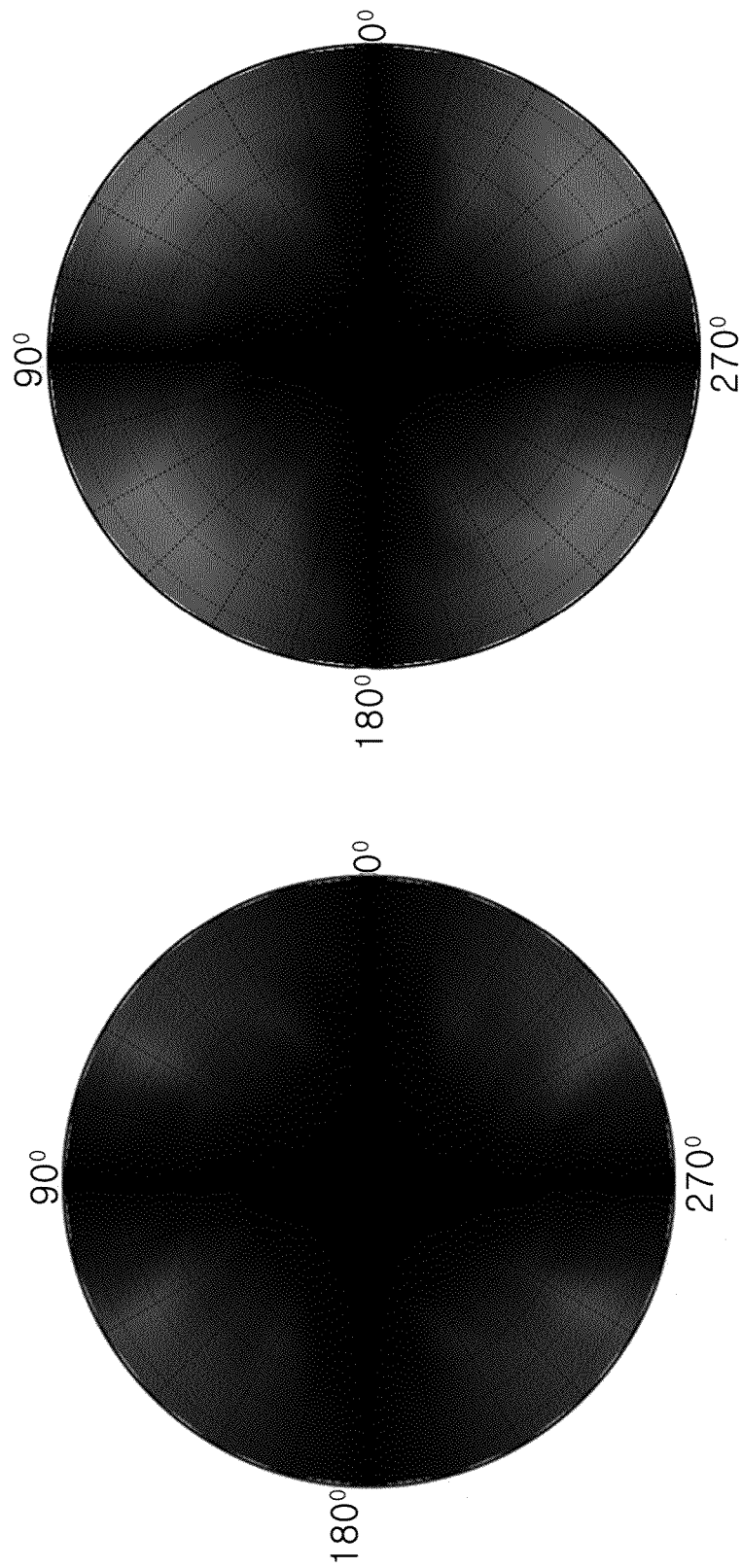
FIG. 18 is a diagram of display characteristics of the liquid crystal display of FIG. 17, according to exemplary embodiments.

FIG. 17 is a cross-sectional view of a liquid crystal display, according to exemplary embodiments. FIG. 18 is a diagram of display characteristics of the liquid crystal display of FIG. 17, according to exemplary embodiments.

According to exemplary embodiments, the lower polarizer 12 may be similarly configured as described in FIG. 8.

However, according to exemplary embodiments, the upper polarizer 22 may be modified, and will be described with reference to FIG. 17.

In general, the liquid crystal display of FIG. 17 is similar to as the liquid crystal display described in association with FIG. 1. However, in FIG. 17, the liquid crystal layer 3 and the upper and lower polarizers 22' and 12' are illustrated.

The liquid crystal display includes backlight unit 500, optical sheet 25, lower panel 100, liquid crystal layer 3, and upper panel 200.

While not illustrated, the backlight unit 500 includes a light source, a light guide plate, and a reflector. The optical sheet 25 is disposed on the backlight unit 500.

The configuration of backlight unit 500 enables light supplied from the light source to pass through the light guide plate and the reflector, and thereby, to be discharged upward from the backlight unit 500 and pass through the optical sheet 25 disposed on the backlight unit 500. In this manner, the light may propagate through lower panel 100, liquid crystal layer 3, and upper panel 200.

According to exemplary embodiments, the light source may be (or otherwise include), for example, a fluorescent lamp (such as a CCFL), a LED, and/or the like. The light source may be disposed on a side or a lower surface of the backlight unit 500.

The optical sheet 25 may include at least one optical sheet and may include a prism sheet including a prism structure or a diffusion film, such as a diffuser. In exemplary embodiments, the optical sheet 25 may not include a luminance improvement film that typically includes two layers having different refractive indices that are repetitively formed. Namely, because a lower polarizer 12 may be utilized that includes a repetitively laminated structure 12-11 that includes a multilayer (e.g., two layer) structure having different refractive indices repetitively formed, improved characteristics in luminance may be achieved without the use of a luminance improvement film associated with optical sheet 25.

Lower panel 100, liquid crystal layer 3, and upper panel 200 are disposed on the backlight unit 500 and optical sheet 25.

First, the lower panel 100 will be described.

A lower polarizer 12' is coupled below a lower insulation substrate 110, which may be made of transparent glass or plastic.

The lower polarizer 12' may be a reflective polarizer, and may include only the first repetitively laminated structure 12-11 unlike exemplary embodiments described in association with FIG. 8. While not illustrated, the lower polarizer 12' may also include a buffer layer 12-5 according to exemplary embodiments. The lower polarizer 12' may also include a plurality of first repetitively laminated structures 12-11.

The buffer layer 12-5 may be configured to protect or connect the first repetitively laminated structures 12-11.

The lower polarizer 12' is coupled to the outer side of the lower insulation substrate 110, and includes an adhesive (not illustrated) for attachment.

Although not illustrated, a thin film transistor and a pixel electrode may be disposed on an inner side of the lower insulation substrate 110. The thin film transistor and the pixel electrode may be formed in any one of various structures. An alignment layer (not shown) may be disposed on the pixel electrode.

Hereinafter, the upper panel 200 will be described.

An upper polarizer 22' is disposed on an upper insulation substrate 210 made of transparent glass or plastic.

The upper polarizer 22' includes a C plate 22-4 unlike FIG. 7, as an absorptive polarizer.

That is, referring to FIG. 17, in the upper polarizer 22,' which is an absorptive polarizer, a TAC layer 22-2 is disposed on the upper surface of a PVA layer 22-1, and the C plate 22-4, which is a monoaxial compensation layer, and a biaxial compensation layer 22-3 are disposed on the lower surface of the PVA layer 22-1. The C plate 22-4 and the biaxial compensation layer 22-3 may be configured to provide a phase retardation to improve display quality. According to exemplary embodiments, one of the C plate 22-4 and the biaxial compensation layer 22-3 may be omitted.

The upper polarizer 22' is coupled to an outer side of the upper insulation substrate 210. An outer surface of the TAC layer 22-2 of the upper polarizer 22' may be subjected to one or more surface treatments, such as one or more anti-glare or anti-reflection treatments.

While not illustrated, a light blocking member, a color filter, and a common electrode may be disposed on or inside the upper insulation substrate 210. According to exemplary embodiments, at least one of the light blocking member, the color filter, and the common electrode may be formed inside the lower insulation substrate 110. An alignment layer (not shown) may be disposed below the common electrode.

A liquid crystal layer 3 may be disposed between the upper panel 200 and the lower panel 100.

The liquid crystal layer 3 may have negative dielectric anisotropy and may include liquid crystal molecules of a VA type that have long axes that are vertical to the surfaces of panels 100 and 200 when an electric field is not applied to liquid crystal layer 3, and that are aligned in a vertical direction to the electric field when the electric field is applied by the pixel electrode and the common electrode. Additionally or alternatively, the liquid crystal molecules may be of an IPS type and/or a PLS type that have long axes that are horizontal to the surfaces of panels 100 and 200 when an electric field is not applied, and that rotate in a horizontal surface according to a horizontal electric field forming via the pixel electrode and the common electrode.

As such, in the liquid crystal display, the C plate 22-4 is added to the upper polarizer 22' and only the first repetitively laminated structure 12-11 is included in the lower polarizer 12' unlike as described in association with FIG. 8. As a result, a problem that interference colors are generated is removed by the added C plate 22-4 of the upper polarizer 22'.

Illustrative display characteristics of the liquid crystal display described in association with FIG. 17 are described in association with FIG. 18.

In FIG. 18, a case of using a CCFL as a light source is illustrated, and the left drawing is a Comparative Example, in which the C plate 22-4 is not added to the upper polarizer and the lower polarizer includes only the first repetitively laminated structure. The right drawing is associated with the liquid crystal display configured as described in association with the exemplary embodiments of FIG. 17.

As illustrated in FIG. 18, the interference colors may be reduced in the case of using the liquid crystal display configured in association with the exemplary embodiments of FIG. 17. The results associated with the right drawing are the results of a characteristic of the first refractive index layer of the first repetitively laminated structure used in exemplary embodiments includes a characteristic of an A plate, and as a result, the characteristics compensate for each other when the C plate is added to the upper polarizer, as described in association with FIG. 17.

As described above, in the case of FIGS. 8-18, exemplary embodiments in which the interference colors generated when the repetitively laminated structures are included in the lower polarizer in the liquid crystal of the VA mode or the IPS and PLS mode are reduced were described.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A polarizer, comprising:
at least one first repetitively laminated structure comprising two layers of different refractive indices repetitively disposed on one another; and
a second repetitively laminated structure comprising two layers of different refractive indices repetitively disposed on one another,
wherein one of the at least one first repetitively laminated structures is configured as a light incident surface of the polarizer and the second repetitively laminated structure is configured as a light dispersion surface of the polarizer, and
wherein a thickness ratio of the two layers of the at least one first repetitively laminated structure differs from a thickness ratio of the two layers of the second repetitively laminated structure.

2. The polarizer of claim 1, wherein:
the different thickness ratios of the at least one first repetitively laminated structure and the second repetitively laminated structure are determined based on:
materials configuring a first refractive index layer and a second refractive index layer of each of the at least one first repetitively laminated structure and the second repetitively laminated structure, or
a thickness ratio between the first refractive index layer and the second refractive index layer.

3. The polarizer of claim 1, wherein:
a thickness ratio between the first refractive index layer and the second refractive index layer in association with the second repetitively laminated structure is larger than a thickness ratio between the first refractive index layer and the second refractive index layer in association with the at least one first repetitively laminated structure.

4. The polarizer of claim 3, wherein:
the thickness ratio between the first refractive index layer and the second refractive index layer in association with the second repetitively laminated structure is greater than 0.644 and less than 10.

5. The polarizer of claim 1, further comprising:
a plurality of buffer layers,
wherein:
the polarizer comprises two first repetitively laminated structures and one second repetitively laminated structure,
a first one of the two first repetitively laminated structures is disposed on a first one of the plurality of buffer layers,
a second one of the plurality of buffer layers is disposed between at least one of the two first repetitively laminated structures and the second repetitively laminated structure, and
a third one of the plurality of buffer layers is disposed on the second repetitively laminated structure.

6. A liquid crystal display, comprising:
an upper panel comprising:
an upper polarizer configured as an absorptive polarizer, and
an upper insulation substrate;
a lower panel comprising:
a lower polarizer, and
a lower insulation substrate;
a liquid crystal layer disposed between the upper panel and the lower panel; and
a backlight providing unit configured to supply light,
wherein the lower panel is disposed on the backlight providing unit,
wherein the lower polarizer comprises:
at least one first repetitively laminated structure comprising two layers of different refractive indices repetitively disposed on one other, and
a second repetitively laminated structure comprising two layers of different refractive indices repetitively disposed upon one another,
wherein the second repetitively laminated structure is disposed closer to the liquid crystal layer than the at least one first repetitively laminated structure, and
wherein a thickness ratio of the two layers of the at least one first repetitively laminated structure differs from a thickness ratio of the two layers of the second repetitively laminated structure.

7. The liquid crystal display of claim 6, wherein:
the different thickness ratios of the at least one first repetitively laminated structure and the second repetitively laminated structure are determined based on:
materials configuring a first refractive index layer and a second refractive index layer of each of the at least one fist repetitively laminated structure and the second repetitively laminated structure, or
a thickness ratio between the first refractive index layer and the second refractive index layer.

8. The liquid crystal display of claim 6, wherein:
a thickness ratio between the first refractive index layer and the second refractive index layer in association with the second repetitively laminated structure is larger than a thickness ratio between the first refractive index layer and the second refractive index layer in association with the at least one first repetitively laminated structure.

9. The liquid crystal display of claim 6, wherein:
the thickness ratio between the first refractive index layer and the second refractive index layer in association with the second repetitively laminated structure is greater than 0.644 and less than 10.

10. The liquid crystal display of claim 6, wherein:
the lower polarizer further comprises a plurality of buffer layers;
the lower polarizer comprises two first repetitively laminated structures and one second repetitively laminated structure;
a first one of the two first repetitively laminated structures is disposed on a first one of the plurality of buffer layers;
a second one of the plurality of buffer layers is disposed between at least one of the two first repetitively laminated structures and the second repetitively laminated structure;
a third one of the plurality of buffer layers is disposed on the second repetitively laminated structure.

11. The liquid crystal display of claim 6, wherein:
the liquid crystal layer comprises liquid crystal molecules vertically aligned when an electric field is not applied and horizontally aligned when a vertical electric field is imposed on the liquid crystal layer; or
the liquid crystal layer comprises liquid crystal molecules horizontally aligned when an electric field is not applied and rotate in a horizontal surface when a horizontal electric field is imposed on the liquid crystal layer.

* * * * *